F. W. ELSINGER.
ADJUSTABLE LINK BELT.
APPLICATION FILED SEPT. 29, 1919.
1,404,842.
Patented Jan. 31, 1922.
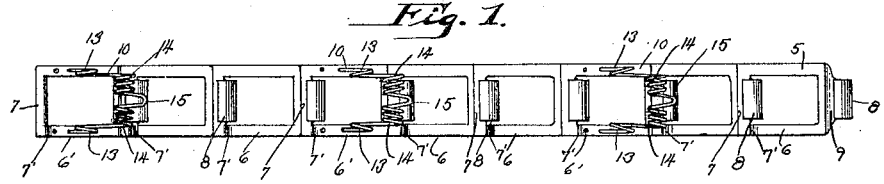
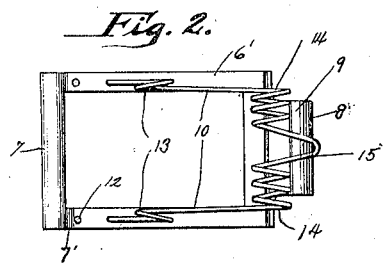
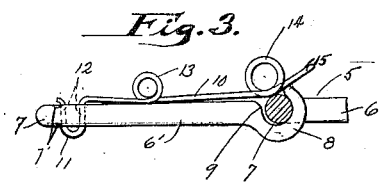
INVENTOR.
Francis W. Elsinger.
BY
Morsell + Keeney,
ATTORNEYS.

UNITED STATES PATENT OFFICE.

FRANCIS W. ELSINGER, OF HARTFORD, WISCONSIN.

ADJUSTABLE LINK BELT.

1,404,842.    Specification of Letters Patent.    Patented Jan. 31, 1922.

Application filed September 29, 1919. Serial No. 327,106.

*To all whom it may concern:*

Be it known that I, FRANCIS W. ELSINGER, a citizen of the United States, and resident of Hartford, in the county of Washington and State of Wisconsin, have invented new and useful Improvements in Adjustable Link Belts, of which the following is a description, reference being had to the accompanying drawings, which are a part of this specification.

The present invention relates to certain new and useful improvements in belts and refers more particularly to what may be termed a chain or link belt.

Belts of the character stated have proven more or less unsatisfactory, as when it is desired to either remove, replace, shorten, lengthen or tighten the same, considerable labor must be spent. Hence, with these and other inherent objections in view, my invention has for one of its objects to provide a chain or link belt having means whereby the same may be easily removed, replaced, readily lengthened, shortened, or tightened without much labor.

Another object of the present invention is to provide a master link for a belt of the class described which will be readily operable for permitting the engagement with or disengagement of the link from the adjacent link of the belt without having the chain so slack as to permit the disengagement or engagement by bending one link back so far as to release it in the manner in which ordinary sprocket chain links are detached.

A further object of the present invention is to provide a master link of the class described which will have a resilient yoke for closing the throat of the attached hook carried thereby and adapted to receive the adjacent end of the next link of the belt.

A still further object of the present invention is to provide a finger member carried by the resilient yoke forming a hold or lever for assisting in the convenient inserting of the end of a link in the hook of the master link.

With the above and other objects in view, which will appear as the description proceeds, my invention resides in the novel construction, combination and arrangement of parts substantially as hereinafter described and more particularly defined by the appended claims, it being undersoood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Fig. 1 is a top plan view of a section of a chain or link belt embodying the features of my invention.

Fig. 2 is a top plan view of one of the master links detached, and

Fig. 3 is a side plan view of one of the master links, a portion of the adjacent link being shown to illustrate the manner of connecting the same with the master link.

Referring now more particularly to the accompanying drawing, the numeral 5 designates a belt formed by a plurality of substantially rectangular link members 6, each having one end 7 rounded and its other end provided with an extended or projected lip or hook member 8. In belts of this class now in general use, the hook members 8 have the rounded ends 7 inserted therein, for which purpose every link is provided with a groove 7' near the rounded end so as to permit the end 7 to slide into the hook member 8, their throats 9 being of less width than the diameter of the rounded ends 7 whereby the links 6 are pivotally and detachably connected together.

In order that the belt may be readily removed from or replaced on sprockets, lengthened, shortened or tightened, I provide, at intervals in the belt, a plurality of master links 6' which are substantially the same as the links 6 with the exception that the throats 9 thereof are of a greater width than the rounded portion 7 of the links whereby they may be readily placed therein or removed therefrom, not from the side as the ordinary links but from above. In order that the throats 9 of the master links 6' may be closed to prevent the accidental displacement therefrom of the end 7 of the adjacent link, I provide a yoke-shaped member or finger 10 which has its ends substantially U-shaped, as at 11, and engaged in apertures 12 in the links 6' adjacent their ends 7. The sides of the members 10 each have a resilient coil 13 formed therein medially of their ends and the outer closed ends of the members 10 are formed with a series of resilient coils 14 or the like adapted to close the throat 9 of the hook member 8 a central lip or finger 15 being provided for convenience in inserting a link in the throat of a master link.

By this structure it will be readily apparent that when it is desired to engage or disengage the master link 6' with the rounded end 7 of a link 6, the end 7 is placed under the finger 15 and then forced thereagainst to act as a lever raising the coil 14 and permitting the end 7 to drop into the throat 9 under action of the resilient yoke member 10 when the same is in line therewith. The coil 14 and the finger 15 close the throat against the accidental disengagement of the end 7 from the hook 8, and the coils 13 serve to maintain a tension to firmly hold the coil 14 and the finger 15 across the throat 9.

What I claim as my invention is:

1. A chain link formed at one end with a hook portion and at the opposite end with means adapted to engage the adjacent link of a chain, the throat of said hook portion being of sufficient width to permit the cross bar of the link adjacent thereto to be freely slipped into holding engagement with said hook portion, and a resilient member secured at one end to said first mentioned link, the opposite end of said member being free and extending over the throat of said hook portion, for the purpose described.

2. A chain link formed at one end with a hook portion and at the opposite end with means adapted to engage the adjacent link of a chain, the throat of said hook portion being of sufficient width to permit the cross bar of the link adjacent thereto to be freely slipped into holding engagement with said hook portion, and a U-shaped spring the legs of which are anchored to said first mentioned link, the opposite end of said spring being free and extending over the throat of said hook portion, for the purpose described.

In testimony whereof I affix my signature.

FRANCIS W. ELSINGER.